United States Patent
Connell, II et al.

(10) Patent No.: US 9,626,001 B2
(45) Date of Patent: Apr. 18, 2017

(54) SPEECH RECOGNITION CANDIDATE SELECTION BASED ON NON-ACOUSTIC INPUT

(71) Applicant: International Business Machines Corporation, Armonk, NY (US)

(72) Inventors: Jonathan H. Connell, II, Cortlandt-Manor, NY (US); Etienne Marcheret, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 14/540,527

(22) Filed: Nov. 13, 2014

(65) Prior Publication Data

US 2016/0140955 A1 May 19, 2016

(51) Int. Cl.
*G06F 3/01* (2006.01)
*G10L 15/20* (2006.01)
*G10L 15/25* (2013.01)
*G10L 15/26* (2006.01)
*G10L 15/24* (2013.01)
*G10L 21/10* (2013.01)
*G10L 15/22* (2006.01)
*G10L 21/06* (2013.01)

(52) U.S. Cl.
CPC .............. *G06F 3/017* (2013.01); *G10L 15/22* (2013.01); *G10L 15/24* (2013.01); *G10L 15/25* (2013.01); *G10L 15/26* (2013.01); *G10L 21/10* (2013.01); *G10L 2015/223* (2013.01); *G10L 2015/226* (2013.01); *G10L 2021/065* (2013.01)

(58) Field of Classification Search
CPC .......... G10L 15/24; G10L 15/25; G10L 15/26
See application file for complete search history.

(56) References Cited

U.S. PATENT DOCUMENTS

| | | | | |
|---|---|---|---|---|
| 5,586,215 A | * | 12/1996 | Stork | G06K 9/00268 704/232 |
| 6,633,844 B1 | * | 10/2003 | Verma | G10L 15/25 345/441 |
| 6,804,645 B1 | | 10/2004 | Kleinschmidt | |
| 7,518,631 B2 | | 4/2009 | Hershey et al. | |
| 7,835,908 B2 | | 11/2010 | Choi et al. | |
| 8,150,107 B2 | | 4/2012 | Kurzweil et al. | |
| 2002/0105575 A1 | | 8/2002 | Hinde et al. | |
| 2005/0283364 A1 | * | 12/2005 | Longe | G06K 9/00422 704/257 |
| 2008/0059175 A1 | * | 3/2008 | Miyajima | G10L 15/25 704/246 |

(Continued)

FOREIGN PATENT DOCUMENTS

EP 0254409 A1 1/1988
EP 0254409 B1 1/1988

*Primary Examiner* — Samuel G Neway
(74) *Attorney, Agent, or Firm* — Alexa L. Ashworth; Ryan, Mason & Lewis, LLP

(57) ABSTRACT

A method includes the following steps. A speech input is received. At least two speech recognition candidates are generated from the speech input. A scene related to the speech input is observed using one or more non-acoustic sensors. The observed scene is segmented into one or more regions. One or more properties for the one or more regions are computed. One of the speech recognition candidates is selected based on the one or more computed properties of the one or more regions.

20 Claims, 5 Drawing Sheets

(56) References Cited

U.S. PATENT DOCUMENTS

| | | |
|---|---|---|
| 2008/0147404 A1 | 6/2008 | Liu et al. |
| 2009/0018828 A1 | 1/2009 | Nakadai et al. |
| 2010/0146464 A1 | 6/2010 | Wilson et al. |
| 2011/0019835 A1 | 1/2011 | Schmidt et al. |
| 2011/0071830 A1* | 3/2011 | Kim .................. G01C 21/3602 704/246 |
| 2011/0224978 A1* | 9/2011 | Sawada .............. G06K 9/00221 704/231 |
| 2011/0305384 A1 | 12/2011 | Aoyama et al. |
| 2011/0311144 A1* | 12/2011 | Tardif .................... G10L 15/25 382/195 |
| 2013/0054240 A1* | 2/2013 | Jang .................... G06K 9/6292 704/235 |
| 2013/0339027 A1* | 12/2013 | Dokor .................... G06F 17/20 704/275 |
| 2014/0379346 A1* | 12/2014 | Aleksic .................. G10L 15/25 704/251 |
| 2015/0172830 A1 | 6/2015 | Liu et al. |
| 2015/0235641 A1* | 8/2015 | VanBlon ................ G10L 15/24 704/235 |
| 2015/0331490 A1 | 11/2015 | Yamada |
| 2015/0364139 A1 | 12/2015 | Dimitriadis et al. |
| 2016/0140955 A1* | 5/2016 | Connell, II ............ G10L 15/08 704/235 |
| 2016/0140959 A1* | 5/2016 | Connell, II ............ G10L 15/22 704/245 |
| 2016/0140963 A1* | 5/2016 | Connell, II ............ G10L 15/08 704/231 |
| 2016/0140964 A1* | 5/2016 | Connell, II ............ G10L 15/22 704/231 |

\* cited by examiner

Object properties and relations

SPEECH RECOGNITION CANDIDATE SELECTION BASED ON NON-ACOUSTIC INPUT

CROSS-REFERENCE TO RELATED APPLICATION

The present application is related to U.S. patent application Ser. No. 14/540,554 filed concurrently herewith, the disclosure of which is incorporated by reference herein.

FIELD

The field relates generally to speech recognition and, more particularly, to techniques for selecting between words or phrases in a speech recognition system.

BACKGROUND

Speech recognition is the translation of spoken words to text and, more particularly, it is the computer-driven transcription of spoken language into readable text in real-time. Speech recognition technology was initially developed to aid individuals in tasks where their hands were busy. It can also aid people with disabilities. For example, speech recognition systems could be helpful for people who are deaf or cannot operate a standard keyboard, such as those affected by cerebral palsy or even arthritis.

Speech recognition systems are rapidly increasing in significance in many areas of data and communications technology. In recent years, speech recognition has advanced to the point where it is used by millions of people across various applications. Speech recognition applications now include interactive voice response systems, voice dialing, data entry, dictation mode systems including medical transcription, automotive applications, etc. There are also "command and control" applications that utilize speech recognition for controlling tasks such as adjusting the climate control in a vehicle or requesting a smart phone to play a particular song.

The performance of a speech recognition system is usually evaluated in terms of accuracy and speed. Therefore, regardless of the application, a goal of any speech recognition system is to accurately and efficiently convert speech into actionable commands or readable text.

SUMMARY

Embodiments of the invention provide techniques for determining words or phrases in a speech recognition system using non-acoustic sensors.

For example, in one embodiment of the invention, a method comprises the following steps. A speech input is received. At least two speech recognition candidates are generated from the speech input. A scene related to the speech input is observed using one or more non-acoustic sensors. The observed scene is segmented into one or more regions. One or more properties for the one or more regions are computed. One of the speech recognition candidates is selected based on the one or more computed properties of the one or more regions.

In another embodiment, an article of manufacture comprises a computer readable storage medium for storing computer readable program code, which, when executed, causes a computer to perform one or more of the above mentioned steps.

In a further embodiment, an apparatus comprises a memory and a processor operatively coupled to the memory, and configured to perform one or more of the above mentioned steps.

These and other objects, features, and advantages of the present invention will become apparent from the following detailed description of illustrative embodiments thereof, which is to be read in connection with the accompanying drawings.

DETAILED DESCRIPTION

Figure 1:
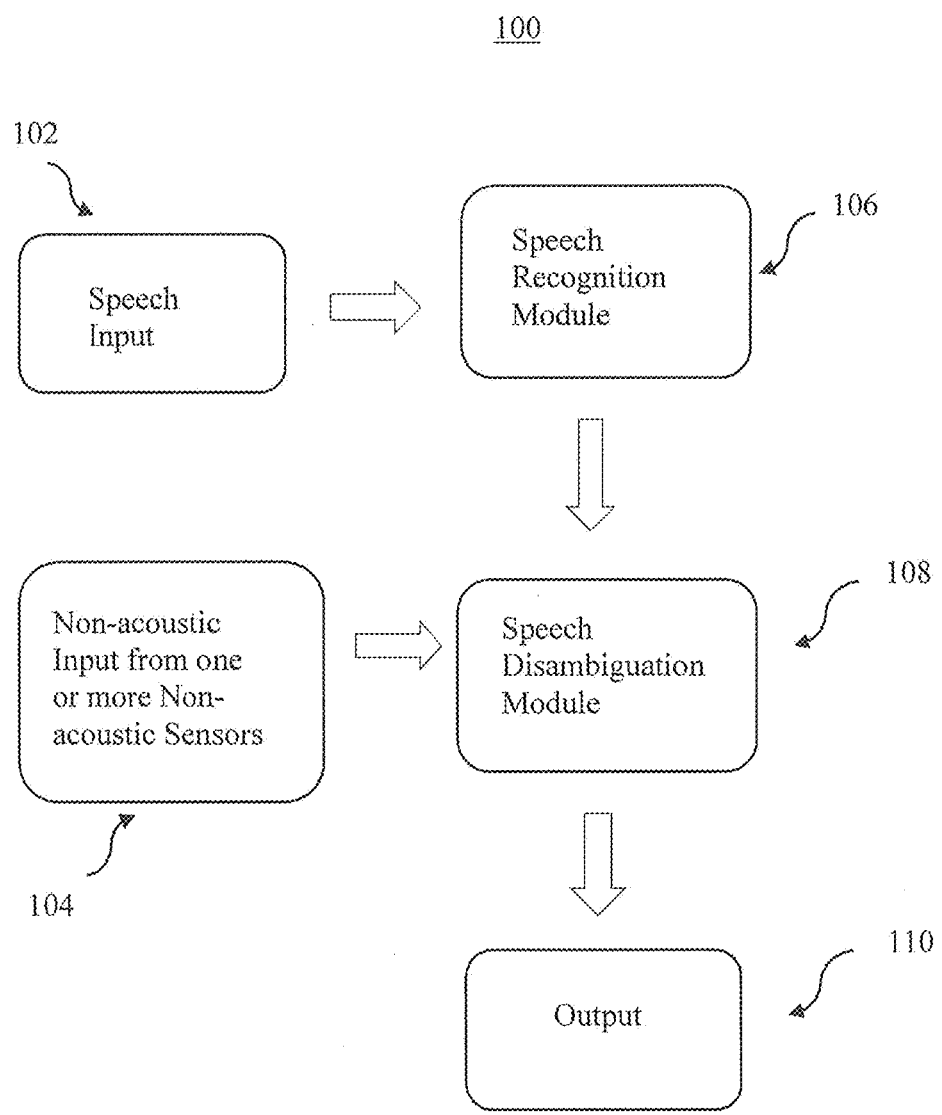
FIG. 1 depicts an overview of a speech recognition system according to an embodiment of the invention.

Illustrative embodiments of the invention may be described herein in the context of illustrative methods, systems and devices for speech recognition using non-acoustic sensors. However, it is to be understood that embodiments of the invention are not limited to the illustrative methods, systems and devices but instead are more broadly applicable to other suitable methods, systems and devices.

As used herein, non-acoustic sensors refer to devices which detect and capture information in a modality other than an audio-only modality, for example, devices which detect and capture visual imagery such as, but not limited to, a camera, an infra-red sensor, a depth sensor (e.g., Microsoft Kinect™), or any suitable optical or imaging sensor.

It is desirable for a speech recognition system to successfully identify in real-time, all words that are intelligibly spoken by an individual, independent of noise, vocabulary or context. For example, there are a number of words that sound similar acoustically, yet in a speech recognition system, determining which word was actually intended is quite important. Also, even when words are correctly recognized, it may not be possible to "ground" (i.e., tie or associate) the word to some specific object based solely on the utterance. Since it is usually vital to perform subsequent actions on the appropriate object in a "command and control" speech application, obtaining the correct word and grounding from the speech recognition system is also desirable and/or necessary.

Conventionally, selecting the transcription for an acoustic fragment corresponding to a word can be done using a rigid grammar. As there are only so many possible choices for each part of a sentence, e.g., when a pizza topping is expected in an order it can be either "anchovies" or "olives" but never "pickles". The list of valid words can even be changed dynamically, e.g., according to what is being sold that week. However, the list of suitable choices can become quite large with no indication of which one in the list of suitable choice is more likely in the current situation. Moreover, just because a word has a low probability does not necessarily mean it is the wrong choice. Therefore, much of the original ambiguity problem remains.

Another common method of choosing between plausible word candidates involves using a statistical n-gram Language Model (LM) for a domain. This provides a likelihood of one word versus another based on the surrounding context of other words. However, a robust LM requires a large amount of data in order to construct, and different LMs are required for different application domains (e.g., "star" in the domain of science is different from that of music and thus the probabilities of observing nearby words like "red giant" vary considerably).

On the semantic side, determining the correct grounding for a phrase can be done through an additional dialog with the user. For example, after hearing "Look at the man with the telescope," the system could ask "You mean look at the man holding the telescope?" However, this question interrupts the original flow of the conversation and takes additional time and is therefore inefficient. As such, it would be desirable if the speech recognition system could automatically determine the correct prepositional phrase binding based on contextual information.

Advantageously, illustrative embodiments of the invention use one or more non-acoustic sensors to improve speech recognition. Furthermore, illustrative embodiments of the invention automatically determine the correct word or phrase based on contextual information.

Embodiments of the invention resolve speech ambiguities based on what is captured by one or more non-acoustic sensors (e.g., a camera). Illustratively, embodiments of the invention constrain the choice of nouns, proper nouns, adjectives, prepositions, and even verbs and adverbs by assuming the referent is in immediate area. Possible acoustic translations that do not correspond to immediately perceptible properties or feasible actions are rejected. Properties as used herein can be, but not limited to, characteristics such as an object type, name, color, or position. Differentiating properties can also include the relation between a user (not necessarily the speaker) and some object via mechanisms such as gestures (e.g., pointing).

FIG. 1 shows an overview of a speech recognition system according to an embodiment of the invention. Speech recognition system 100 receives speech input 102. Speech input 102 may be received in the form of an audio recording and/or audio signal, and may be captured and transmitted by an audio component of a device such as a microphone. Speech input 102 is then processed by speech recognition module 106. Speech recognition module 106 then generates candidate words or phrases based on the received speech input 102. Speech recognition module 106 may be implemented using applicable methods, such as, but not limited to, Hidden Markov modeling, deep neural networks, or any suitable statistical-based or rule-based speech recognition algorithm.

Typically, an audio signal in the form of a digitized audio waveform is pre-processed by algorithms such as echo cancellation and spectral subtraction to remove artifacts introduced by the communication channel and/or ambient environment. If multiple audio signals are acquired, a variety of phased-array beam forming techniques can be used to reject sounds not coming from a specific location or direction. Even for the case of a single audio input, there are advanced techniques for blind source separation that can be used to suppress extraneous interference and increase the clarity of the speaker.

After pre-processing, the audio signal is usually converted to a frequency-based representation such as Mel-Frequency Cepstral Coefficients (MFCC). These features are then further augmented by such as overall acoustic volume, fundamental voicing pitch, time derivatives in various frequency bands, or learned features computed over short temporal windows (e.g., Linear Discriminant Analysis). These augmented features are then used to assess the probability that a particular word, phoneme, or phone was heard. In more modern systems, this computation is performed by a specially trained deep neural network. Traditional systems tend to use Gaussian mixture models (GMMs) instead. The neural networks or GMMs may optionally be trained for a specific individual to give improved results. Alternatively, speaker-adaptation may be performed on the augmented features to shift them closer to the values expected of a canonical speaker.

Finally, the probability of hearing particular acoustic fragments is combined with the a priori likelihood of hearing a particular sequence of those fragments to find the overall most probable utterance. This combination is often done using dynamic programming, via a Viterbi or forward-backward algorithm, in a Hidden Markov Model (HMM) where the transition probabilities are governed by a grammar or language model. The candidate words or phrases generated by speech recognition module 106 are then sent to speech disambiguation module 108 for processing.

Speech disambiguation module 108 also receives non-acoustic input 104 for processing. Non-acoustic input 104 can be received from one or more non-acoustic sensors in the form of a video signal and/or a visual image, e.g., an observed scene. Non-acoustic input 104 can be captured and transmitted by non-acoustic sensors on a device such as a camera or any other suitable optical sensor. Illustratively, the speech input 102 may be captured by a microphone and non-acoustic input 104 may be captured by a camera at the same time or substantially contemporaneously with one another. The camera and microphone may be on the same or different devices. Preferably, the observed scene of non-acoustic input 104 is related to the content and context of speech input 102. As used herein, "content" refers to a topic of the speech input, and "context" refers to the circumstances, setting or surrounds of the speech input. The speech disambiguation module 108 will be further described in the context of FIGS. 2-4 below. The resulting phrase(s) or word(s) from the speech disambiguation module 108 are then transcribed as text and sent as output 110 for display on a device or sent as output 110 for further interpretation as a functional command (e.g., for use by applications or robots that utilize speech recognition for controlling tasks). A device may be a tablet, a smartphone, a laptop or any other suitable electronic or computing device. Alternative embodiments of the speech recognition system 100 may comprise more or less functionally equivalent modules. All modules can be integrated within a single system or within multiple systems which may be remotely located. It is to be understood that speech recognition module 106 and speech disambiguation module 108 may be implemented using hardware, software or a combination of hardware and software running on one or more computing or other processing devices.

Figure 2:
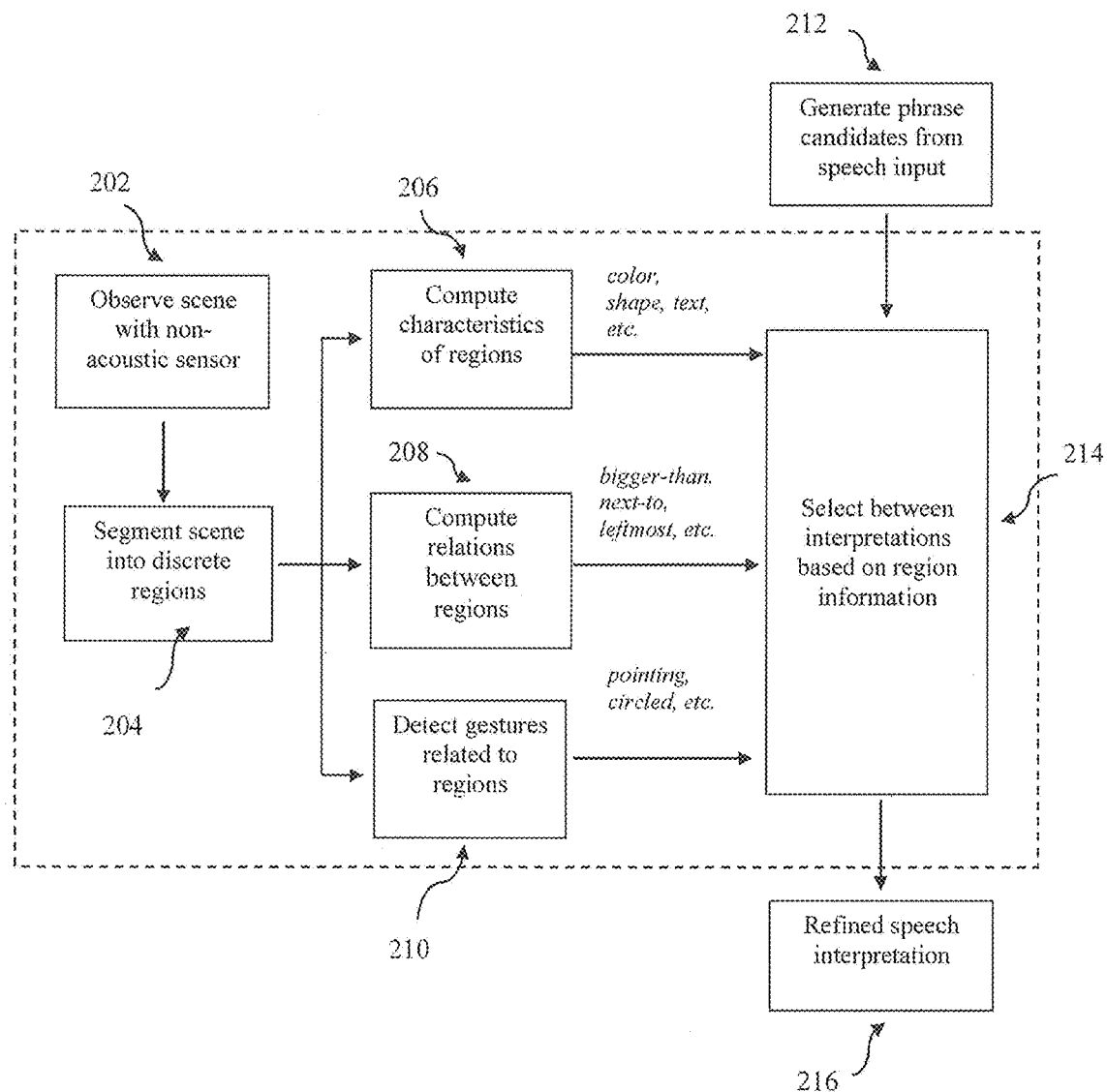
FIG. 2 depicts an illustrative embodiment of a speech disambiguation module used in the speech recognition system of FIG. 1.

FIG. 2 shows an exemplary embodiment of the speech disambiguation module 108 of FIG. 1. The speech disambiguation module 200, represented by the dashed-lined box, uses a multi-modal speech interpretation process as follows. At step 202, a scene observed by one or more non-acoustic sensors is received (e.g., the non-acoustic input 104 of FIG. 1 above). Then at step 204, the observed scene is segmented into discrete regions. In one embodiment, a color camera observes the scene being discussed (e.g., the discussion in speech input 102 of FIG. 1) and separates the scene into regions corresponding to objects and surfaces, for example, a tabletop or a wall. This can be done on the basis of finding differences relative to a background that is homogeneous in some property such as color or depth. Adjacent connected regions can then be grouped into a number of discrete objects. Alternatively, this can be done by fitting a library of possible object models to the image, which would be useful in the case of clutter. Still further, an image recognition algorithm may be used to find specific objects instead of classes of shapes. Once the scene has been segmented into regions (objects or surfaces, such as the table), the system can compute the properties of each region.

At step 206, the characteristics of each region are computed. Characteristics of the regions can include, but are not limited to, color distribution, shape category (e.g., box, bottle), size (image or real-world), position, and text (e.g., labels). Optionally, a method may also be used to attempt to interpret labels on the objects, for example, using Optical Character Recognition (OCR), barcode, Quick Response (QR) code or logo recognition.

At step 208, relationships between regions can also be derived. Relationships can include a position of the region relative to another, such as "near", "far", "bigger than", "to the left of", and "on top of". Spatial relations can also be determined based on the segmentation of the objects. Illustratively, in practice, the speech disambiguation module 200 could compute the centroid of the pixels associated with each object, then examine the x coordinates of these points in the image. Objects whose centroids are in the left third of the image would be tagged as "left". The object with the lowest overall x coordinate would be the "leftmost" one.

At step 210, gestures related to the regions can also be detected. Examples of gestures include, but are not limited to, pointing to a region or circling a region. An illustrative application of step 210 will be described in the context of FIG. 4 below.

At step 212, candidate words or phrase are also received, these candidate words or phrases correspond to the ones generated from the speech recognition module 106 of FIG. 1 above. At step 214, using the visually derived scene description and the candidate words or phrases generated from the speech input, the speech disambiguation system 200 can judge the suitability of various acoustic transcription proposed by the speech recognition system and select the appropriate word or phrase based on the information. At step 216, the refined speech interpretation is then sent as output, corresponding to output 110 of FIG. 1.

As an illustrative example, at step 206, size may be assessed based on raw pixel count, so a "big" object is defined as having more than 2000 pixels in the image. This also gives a basis for comparison, an object rendered with 1500 pixels being "bigger" than an object rendered with only 1000 pixels. More detailed analysis of the object pixels can also be performed as part of step 206. For example, the color word(s) expected for an object can be found by first converting all the RGB (red-green-blue) pixels into HSI (hue-saturation-intensity) space. A classifier can be used to convert regions of HSI space into particular semantic colors such as "blue" or "black". A histogram can then be formed showing how many pixels there are of each such semantic color. If the histogram bin with the highest occupancy is associated with "red" then, if speech refers to a red object, this object may be a suitable grounding for the phrase. This same information may be used for interpretation arbitration: if none of the objects has very many "gray" pixels in its semantic color histogram, then hearing the phrase "the great big object" becomes preferred over hearing "the gray big object" (step 214). Again, the above techniques are performed by speech disambiguation module 200.

It is to be noted that one of ordinary skill in the art would appreciate that the speech recognition system 100 described herein uses video and audio signal processing methods. For example, the speech input 102 can be an analog and/or digital signal representing speech produced by a source such as a human, the signal is then processed using conventional signal processing methods. Similarly, conventional videos or images can be employed to process information captured by a camera.

An illustrative application of the speech disambiguation module 200 is as follows. Speech input 102 is received and processed by speech recognition module 106. Speech recognition module 106 generates candidate phrases based on the speech input 102. Assume that the candidate phrases include "red ball" and "Red Bull" because of their similarity in sound. These candidate phrases are sent to speech disambiguation module 108, i.e., speech disambiguation module 200 in FIG. 2. Non-acoustic input 104, which is an observed scene related to speech input 102, is also received by speech disambiguation module 200 for processing at step 202, and segmented into regions at step 204. The properties of the regions (e.g., color, size, position, relation, gestures) are computed at steps 206 to 210 and sent for interpretation at step 214. For example, if a characteristically-colored narrow cylinder with appropriate text and logo is found in the observed scene of non-acoustic input 104, then the words "Red Bull" are likely identified as a result of steps 202 to 210. At step 214, the speech disambiguation module 200 can select an interpretation based on the computed properties of the regions received from steps 206 to 210 and the candidate phrases received from step 212. Based on the information received at step 214, "Red Bull" is the preferred transcription rather than "red ball". At step 216 and corresponding step 110, the selected interpretation, "Red Bull," is then transcribed as text for output on a device. Alternatively, the selected interpretation or the associating grounding (i.e., the cylinder itself) is used as a target for robot manipulation or other suitable command and control applications.

Similarly, as another illustrative example, a user said "grab the B*L", where "*" denotes a garbled or ambiguous portion of the phrase. Assuming that the speech recognition module 106 generates "ball" and "bottle" as phrase candidates, if there was a spherical object present but no cylinder present in an observed scene, then "ball" would be preferred over "bottle" as a result of the speech disambiguation module 200.

Figure 3:
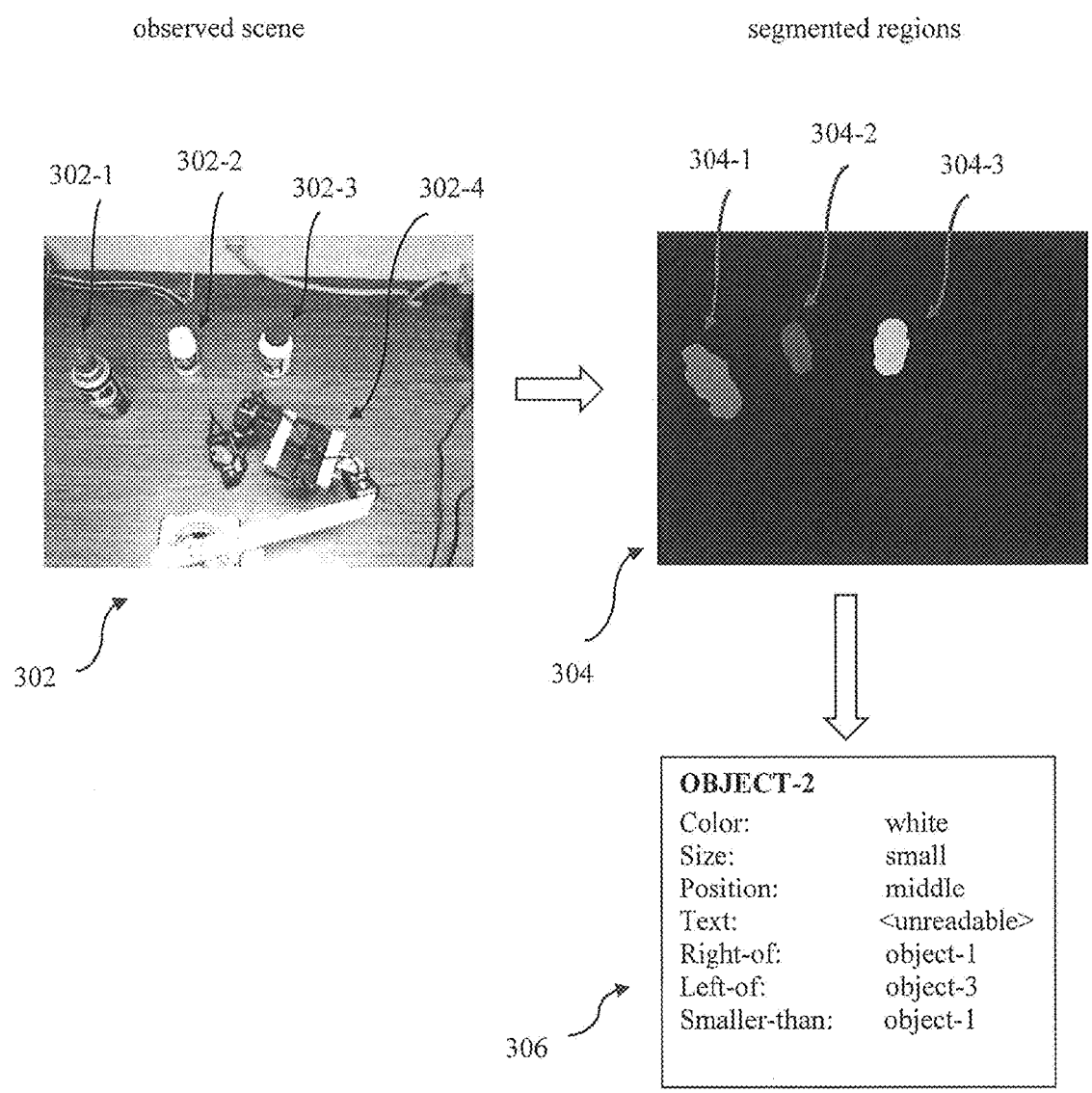
FIG. 3 depicts an exemplary application of the speech recognition system of FIG. 1.

FIG. 3 shows an example of the computed properties for an object in an observed scene using the speech disambiguation module 200 described above. Observed scene 302 is an exemplary visual input that might be received at step 202. Observed scene 302 includes objects 302-1, 302-2 and 302-3 as shown. Observed scene 302 also includes a robotic arm mechanism 302-4 capable of utilizing speech recognition outputs for controlling tasks. At step 204, the observed scene 302 is segmented into regions by object, resulting in segmented scene 304. As shown, segmented scene 304 includes regions 304-1, 304-2 and 304-3, each corresponding to an object in observed scene 302. Illustratively, computed properties 306 includes the results of steps 206 to 210 for region 304-2 (i.e., object 302-2 of observed scene 302). As shown, the computed properties 306 for region 304-2 include color, size, position and text of region 304-2, as well as relational properties of region 304-2 relative to other regions in the scene. Computed properties 306 for region 304-2 would then be sent to step 214 for use in selecting an appropriate interpretation of the words or phrases. Properties for the other regions 304-1 and 304-3 may be computed and transmitted to step 214 in a similar manner. While computed properties 306 show certain resulting properties computed for region 304-2, it is to be understood that other properties may also be computed, such as, for example, the size of region 304-2 relative to region 304-3.

Beyond acoustic disambiguation to resolve ambiguity in similar sounding words or phrases, pronouns and definite anaphora can also be resolved based on information in a scene. For instance "that box" could potentially refer to anything previously discussed or anything in view. However, if there is only one box in the scene (even if it had never been mentioned verbally before), there is no reason to seek further clarification. Similarly, if it is detected that the user is pointing to a particular box (as determined via step 210), then the grounding for "that" is uniquely determined without further verbal interaction. The focus of attention can also be inferred more indirectly using eye gaze angle or head orientation, as derived from the image of the human user, and used similarly to select between targets.

Figure 4:
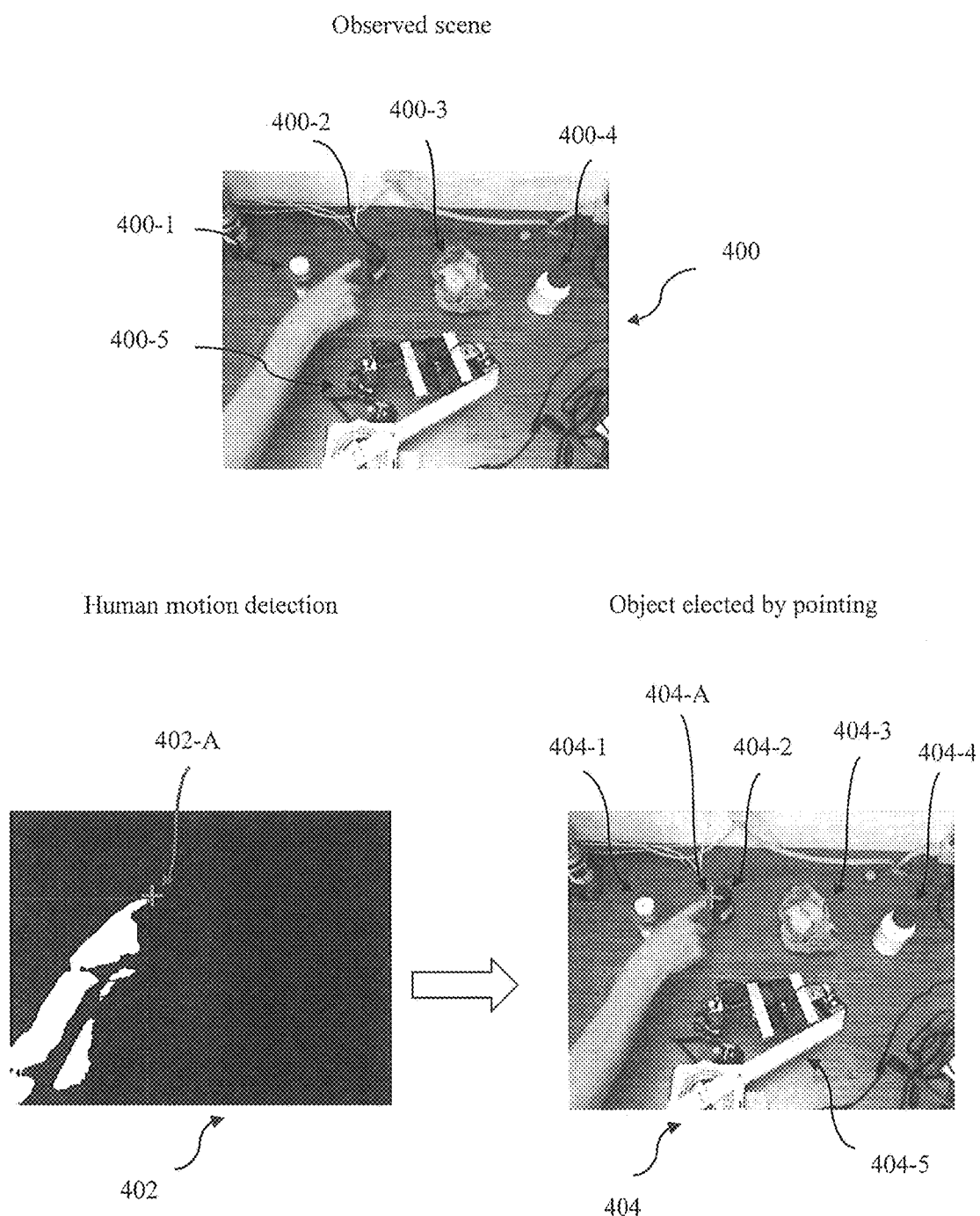
FIG. 4 depicts another exemplary application of the speech recognition system of FIG. 1.

FIG. 4 shows an exemplary application of speech recognition system 100 using gestural disambiguation to improve speech recognition. As shown, observed scene 400 includes objects 400-1, 400-2, 400-3 and 400-4. Observed scene 400 also includes a robotic arm mechanism 400-5 capable of utilizing speech recognition outputs for controlling tasks. Scene 402 is the observed scene 400 as interpreted by speech disambiguation module 200. In scene 402, a human motion/gesture 402-A is detected (e.g., at step 210 of FIG. 2), more particularly, a finger pointing to a region is detected. One way to accomplish this is via background subtraction. Here an image of the initial observed scene 400 containing only objects is compared (pixel-wise) to a scene 402 also including a human arm. The differences are shown as white in scene 402, and the "bounding box" of this difference region is indicated by the two thin lines. The upper rightmost corner of the bounding box can then be interpreted as the pointing location. Based on the computed position of gesture 402-A, as indicated by the "+" sign in the observed scene 402, the system can go on to determine the object selected or referred to in the speech input. For example, in the scenario where the speech input contains the words "that bottle," the observed gesture 402-A can be used to identify corresponding object 404-2 in scene 404 based on the computed properties of the gesture 402-A. It is to be noted that scene 404 corresponds to observed scene 400, with a "+" sign representing the computed position of gesture 404-A.

While not shown in the Figures, more subtle visual information concerning the environment can also be used to aid in speech interpretation. For instance, if the speech recognition system 100 determined that it was viewing items on a table, perhaps by assessing the height of the surface and noticing a woodgrain texture, then a noisy acoustic segment like "*UG" is more likely "mug" than "rug". Similarly, if the system recognizes a refrigerator in the scene, then the system knows the applicable setting or context is the kitchen. This could bias the speech interpretation towards cooking implements rather than, for example, bathroom accessories. Notice that in both cases this extra information is added through a visual channel rather than via an acoustic channel.

Embodiments of the present invention may be a system, a method, and/or a computer program product. The computer program product may include a computer readable storage medium (or media) having computer readable program instructions thereon for causing a processor to carry out aspects of the present invention.

Figure 5:
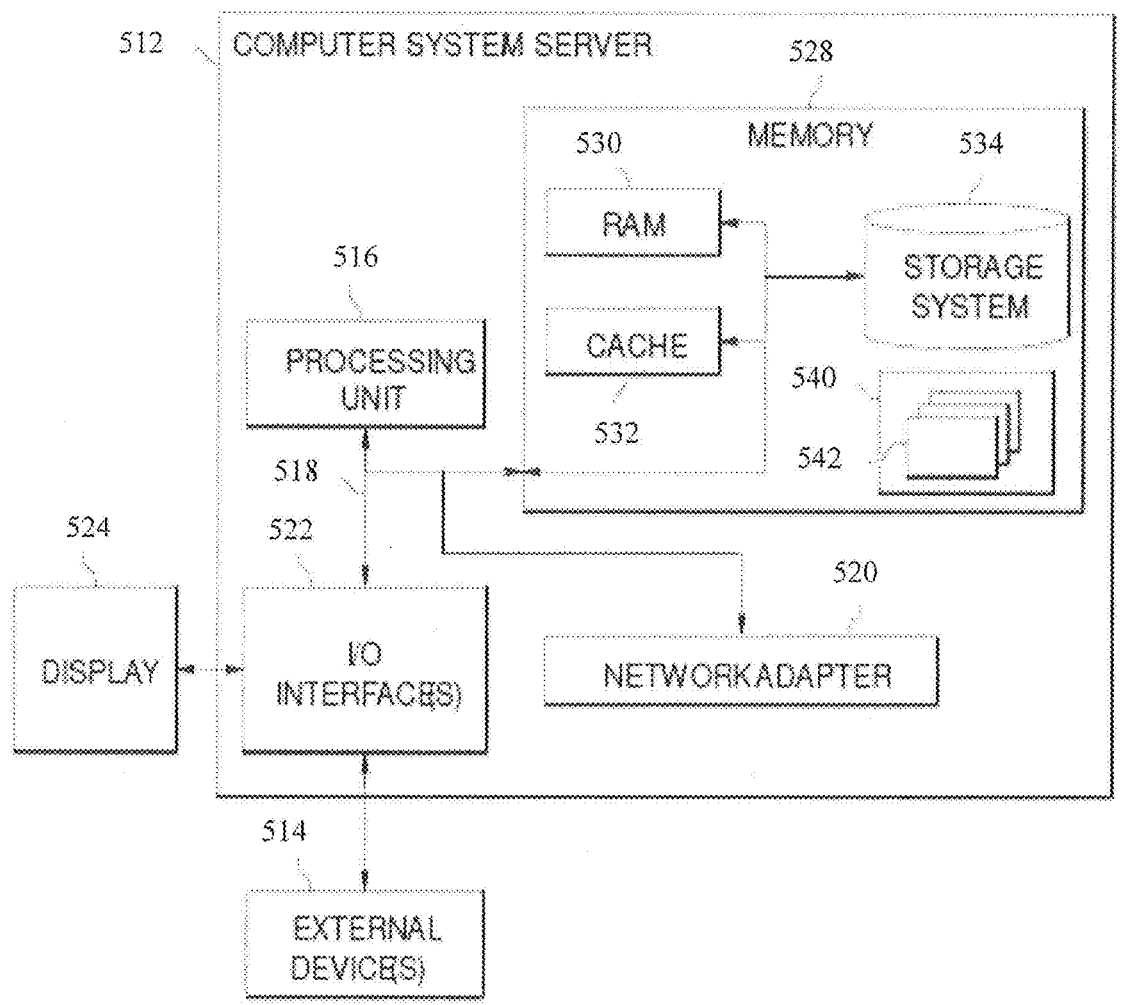
FIG. 5 depicts a computer system in accordance with which one or more components/steps of techniques of the invention may be implemented according to an embodiment of the invention.

Accordingly, the architecture shown in FIG. 5 may be used to implement the various components/steps shown and described above in the context of FIGS. 1-4.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 5, a schematic of an example of a cloud computing node is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

One or more embodiments can make use of software running on a general-purpose computer or workstation. In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An apparatus, comprising:
a memory; and
a processor operatively coupled to the memory and configured to:
receive a speech input;
generate at least two speech recognition candidates from the speech input;
observe a scene related to the speech input using one or more non-acoustic sensors;
segment the observed scene into one or more regions;
compute one or more properties for the one or more regions, wherein the computation of the one or more properties comprises a determination of a textual label using optical character recognition; and
select one of the speech recognition candidates based on the one or more computed properties of the one or more regions.

2. The apparatus of claim 1, wherein each speech recognition candidate comprises one of a word and a phrase.

3. The apparatus of claim 1, wherein the speech recognition candidate is selected based on a comparison of the one or more computed properties of the one or more regions with the two or more speech recognition candidates generated based on the speech input.

4. The apparatus of claim 3, wherein the processor is further configured to interpret the selected speech recognition candidate as a portion of an action command.

5. The apparatus of claim 1, wherein the one or more properties further comprise a color and a shape.

6. The apparatus of claim 1, wherein the computation of the one or more relational properties of the given region comprises a determination of one or more spatial relations between the given region and the remaining ones of the one or more regions.

7. The apparatus of claim 1, wherein the computation of the one or more properties of the one or more regions comprises a detection of one or more gestures.

8. An article of manufacture comprising a computer readable storage medium for storing computer readable program code which, when executed, causes a computer to:
receive a speech input;
generate at least two speech recognition candidates from the speech input;
observe a scene related to the speech input using one or more non-acoustic sensors;
segment the observed scene into one or more regions;
compute one or more properties for the one or more regions, wherein the computation of the one or more properties comprises program code to determine a textual label using optical character recognition; and
select one of the speech recognition candidates based on the one or more computed properties of the one or more regions.

9. The article of claim 8, wherein each speech recognition candidate comprises one of a word and a phrase.

10. The article of claim 8, wherein the speech recognition candidate is selected based on a comparison of the one or more computed properties of the one or more regions with the two or more speech recognition candidates generated based on the speech input.

11. The article of claim 10, further comprising program code to interpret the selected speech recognition candidate as a portion of an action command.

12. The article of claim 8, wherein the one or more properties further comprise a color and a shape.

13. The article of claim 8, wherein the computation of the one or more properties of the one or more regions comprises program code to determine one or more spatial relations between the one or more regions.

14. The article of claim 8, wherein the computation of the one or more properties of the one or more regions comprises program code to detect one or more gestures, and further comprising program code to associate the one or more detected gestures with at least a portion of the one or more regions.

15. The apparatus of claim 3, wherein the processor is further configured to transcribe the selected speech recognition candidate as text for display on a device.

16. The apparatus of claim 1, wherein the one or more non-acoustic sensors comprise at least one camera.

17. The apparatus of claim 1, wherein each of the one or more segmented regions corresponds to an object or a surface in the observed scene.

18. The article of claim 10, further comprising program code to transcribe the selected speech recognition candidate as text for display on a device.

19. The article of claim 8, wherein the one or more non-acoustic sensors comprise at least one camera.

20. The article of claim 8, wherein each of the one or more segmented regions corresponds to an object or a surface in the observed scene.

* * * * *